(12) United States Patent
Fujita et al.

(10) Patent No.: US 8,833,745 B2
(45) Date of Patent: Sep. 16, 2014

(54) SEISMIC ISOLATION DEVICE AND SEISMIC ISOLATION STRUCTURE

(75) Inventors: Satoshi Fujita, Chiyoda-ku (JP); Go Tanaka, Ashikaga (JP); Mitsuru Miyazaki, Ashikaga (JP); Hideo Ozawa, Fujisawa (JP); Ikuo Shimoda, Fujisawa (JP)

(73) Assignee: Tokyo Denki University Oiles Corporation, Tokyo (JP)

( * ) Notice: Subject to any disclaimer, the term of this patent is extended or adjusted under 35 U.S.C. 154(b) by 1110 days.

(21) Appl. No.: 12/739,037

(22) PCT Filed: Oct. 20, 2008

(86) PCT No.: PCT/JP2008/068949
§ 371 (c)(1),
(2), (4) Date: Oct. 29, 2010

(87) PCT Pub. No.: WO2009/054339
PCT Pub. Date: Apr. 30, 2009

(65) Prior Publication Data
US 2011/0227265 A1 Sep. 22, 2011

(30) Foreign Application Priority Data
Oct. 23, 2007 (JP) ................................. 2007-274907

(51) Int. Cl.
*E04H 9/02* (2006.01)
*F16F 15/027* (2006.01)
*E04B 1/98* (2006.01)

(52) U.S. Cl.
CPC ......... *F16F 15/027* (2013.01); *E04H 2009/026* (2013.01); *E04B 1/985* (2013.01); *E04H 9/023* (2013.01)
USPC ...................... 267/140.11; 248/566; 52/167.5

(58) Field of Classification Search
USPC ......... 267/196, 134, 140.11; 52/167.2, 167.4, 52/167.5; 248/566, 570, 562–563, 248/580–581
See application file for complete search history.

(56) References Cited

U.S. PATENT DOCUMENTS 3,308,848 A * 3/1967 Johnson et al. ............... 137/615
6,126,136 A * 10/2000 Yen et al. ...................... 248/560
7,172,343 B2 * 2/2007 Kinno et al. .................. 384/492

FOREIGN PATENT DOCUMENTS

| JP | 01138051 U | 9/1989 |
| JP | 09292092A A | 11/1997 |
| JP | 2000220693 A | 8/2000 |
| JP | 2001012542 A | 1/2001 |
| JP | 2002295054 A | 10/2002 |
| JP | 2004169784 A * | 6/2004 |
| JP | 2004360797 A | 12/2004 |
| JP | 2005331048 A * | 12/2005 |
| JP | 2007271085 A | 10/2007 |

OTHER PUBLICATIONS

Electronic Translation of JP 2005-331048A.*
Electronic Translation of JP2004-169784 A.*

* cited by examiner

*Primary Examiner* — Anna Momper
(74) *Attorney, Agent, or Firm* — Stetina Brunda Garred & Brucker (57) ABSTRACT

The present invention is intended to provide a seismic isolation device which, regardless of a load to be supported, is capable of reducing acceleration through lengthening a natural period of an upper structure, with excellent vibration energy absorbing capacity by obtaining a properly preferable frictional force as well as a returning characteristic, and others.

20 Claims, 5 Drawing Sheets

SEISMIC ISOLATION DEVICE AND SEISMIC ISOLATION STRUCTURE

CROSS-REFERENCE TO RELATED APPLICATIONS

The present application claims priority to International Application No. PCT/JP2008/068949 filed on Oct. 20, 2008, which claims priority to Japanese Patent Application No. 2007-274907 filed on Oct. 23, 2007.

STATEMENT RE: FEDERALLY SPONSORED RESEARCH/DEVELOPMENT

Not Applicable

BACKGROUND OF THE INVENTION

1. Technical Field of the Invention

The present invention relates to a seismic isolation device for light weight structures, such as detached houses, equipments and display stands, and a seismic isolation structure with the seismic isolation device, and more particularly to a seismic isolation device, which is disposed between an upper structure such as a building and a lower structure like a foundation, for reducing transmission of a vibration of the lower structure caused by earthquake, traffic or others to the upper structure and for preventing, for instance, collapse of the upper structure or damage of displayed objects mounted on the upper structure, and so on.

2. Description of the Related Art

As a seismic isolation device that is mounted between an upper structure such as a building and a lower structure such as a foundation to reduce vibration of the upper structure, a device described in Patent document 1 is known. This seismic isolation device is provided with an upper plate fixed to the upper structure and having a spherically concave lower surface with a downward opening; a lower plate fixed to the lower structure and having a spherically concave upper surface with an upward opening; and a sliding body slidably disposed between the upper plate and the lower plate and having a spherically convex upper surface and a spherically convex lower surface.

In the seismic isolation device described in Patent document 1, when a horizontal vibration (displacement) occurs to the lower structure due to an earthquake, sliding of the sliding body is able to prevent the horizontal vibration of the lower structure from being transmitted to the upper structure as it is, which can reduce the vibration of the upper structure. In this seismic isolation device, regardless of a load to be supported by the seismic isolation device, based on pendulum theory, a natural period of the upper structure can be lengthened, in addition, frictional resistance forces generated at contact faces between the upper plate and the sliding body, and between the lower plate and the sliding body to obtain damping action to vibration energy.

Further, as a seismic isolation device floating an upper structure with gas pressure, a seismic isolation device described in Patent document 2 is provided with a skirt-like seal member on a lower face of the upper structure; a tip of the seal member hangs down in a channel formed on a lower structure to hermetically seal a lower space of the upper structure; in the hermetically sealed space is introduced gas for floatation to float the upper structure, which prevents vibration caused by an earthquake from being transmitted to the upper structure. In addition, as this kind of seismic isolation device, in Patent 3 is described a seismic isolation device in which on an accommodation box in which an air supplying means is accommodated is mounted a placing table for placing a displayed object; between the accommodation box and the placing table is arranged an air pad with plural squarely disposed air blowout ports; and from the air blowout ports are jetted air to float the placing table, which prevents the placing table from vibrating at an earthquake.

Patent document 1: Japan utility model registration No. 2586794 gazette

Patent document 2: Japanese patent publication No. 2000-145885 gazette

Patent document 3: Japanese patent publication No. 2001-208131 gazette

SUMMARY OF THE INVENTION

In the seismic isolation device described in Patent document 1, the frictional coefficient of the slide face is uniquely determined in accordance with the materials of the sliding body and the upper and lower structures, and a load to be supported, so that adjustable range of seismic isolation characteristic is narrow as a problem. As a result, when a small frictional force or a large frictional force is required, the material of the sliding face should be changed, and in case that the material of the sliding face is changed, it is necessary to sufficiently consider generation of an excess resistance force caused by static frictional coefficient that may be generated at the start of a slide, which provides difficulty in selection of the material.

On the other hand, in the seismic isolation devices described in Patent documents 2, 3, although large effect is expected in that vibration caused by an earthquake is isolated, in order to effectively use air pressure, accurate sealing technique is required, and when the upper structure floats the friction becomes zero, unless construction accuracy to the lower structure is considerably precisely carried out, position of the upper structure at the floatation becomes unstable, and another device is necessary to return the upper structure to an original position after the vibration due to an earthquake ceased, which necessitates a large-scale facility, resulting in increased cost. Further, the seismic isolation devices described in Patent documents 2, 3 have a defect that a seismic isolation mechanism itself does not act at all when the air supplier breaks or stops due to power failure, etc.

The present invention has been made in consideration of the above problems, and the object thereof is to provide a seismic isolation device, regardless of a load to be supported, capable of reducing acceleration through lengthening a natural period of the upper structure, with excellent vibration energy absorbing capacity by obtaining a properly preferable frictional force as well as a returning characteristic, and so on.

To achieve the above object, the present invention relates to a seismic isolation device, and the device is characterized by comprising: an upper plate fixed to an upper structure and having a spherically concave lower surface with a downward opening; a lower plate fixed to a lower structure and having a spherically concave upper surface with an upward opening; and a movable body arranged between the upper plate and the lower plate, wherein the movable body comprises a spherically convex upper surface opposing to the spherically concave lower surface of the upper plate; and a spherically convex lower surface opposing to the spherically concave upper surface of the lower plate, and the spherically convex upper surface or/and the spherically convex lower surface has plural air blowout ports, and the seismic isolation device switches whether or not air is blown out of the plural air blowout ports, or selects one of the blowing air out of the plural air blowout ports, absorbing air from the plural air blowout ports and not performing both of the blowing and absorbing air to change frictional forces between the movable body and the upper plate, and between the movable body and the lower plate, and changes, in accordance with a magnitude of a horizontal external force added to the lower structure or a magnitude of a vibration transmitted to the upper structure, a horizontal resistance force against the external force or the vibration.

With this invention, when the lower structure horizontally vibrates (displaced) due to an earthquake or the like, the movable body moves along the spherically concave lower surface of the upper plate and the spherically concave upper surface of the lower plate while supporting load between the spherically concave lower surface of the upper plate and the spherically concave upper surface of the lower plate, which can prevent the horizontal vibration of the lower structure from being transmitted to the upper structure as it is, in addition, regardless of a load to be supported by the seismic isolation device, a natural period of the upper structure can be lengthened based on pendulum theory, which allows acceleration to the upper structure to be reduced.

Further, with the present invention, jetting air from the air blowout ports forms an air layer on a surface of the sliding body, or air pressure reduces load of the upper structure supported by the seismic isolation device, so that the movable body can be moved under the condition that no frictional force is generated or frictional force is small. On the other hand, stopping air from the air blowout ports and contacting the movable body to the spherically concave lower surface of the upper plate and the spherically concave upper surface of the lower plate allows the movable body can be slided by a frictional force that is determined by the materials of the upper plate and the lower plate, and a load to be supported. As a result, the frictional force can be controlled without changing the materials of the movable body and others, which makes it possible to obtain a properly preferable frictional force to secure excellent vibration energy absorbing capacity.

Still further, with the present invention, after the earthquake or the like is ceased, the movable body that was moved while receiving external force gradually moves in a reverse direction along inclinations of the spherically concave lower surface of the upper plate and the spherically concave upper surface of the lower plate, and finally returns to the center, so that without another original point returning device, the movable body can be returned to the original point, that is, a returning characteristic can also be secured.

In addition, the present invention relates to a seismic isolation device, and the device is characterized by comprising: an upper plate fixed to an upper structure; a lower plate fixed to a lower structure and having a spherically concave upper surface with an upward opening; a movable body movably arranged on the lower plate; and a pillar-shaped connection part arranged between the movable body and the upper plate, an upper end of the connection part pivoted on the upper plate and a lower end of the connection part fixed to the movable body, wherein the movable body comprises a spherically convex lower surface opposing to the spherically concave upper surface of the lower plate, and plural air blowout ports on the spherically convex lower surface, and the seismic isolation device switches whether or not air is blown out of the plural air blowout ports, or selects one of the blowing air out of the plural air blowout ports, absorbing air from the plural air blowout ports and not performing both of the blowing and absorbing air to change frictional force between the movable body and the lower plate, and changes, in accordance with a magnitude of a horizontal external force added to the lower structure or a magnitude of a vibration transmitted to the upper structure, a horizontal resistance force against the external force or the vibration. With this invention, in the same manner as the above invention, regardless of a load to be supported, a natural period of the upper structure can be lengthened to reduce acceleration, and obtaining a properly preferable frictional force enables excellent vibration energy absorbing capacity as well as a returning characteristic.

Further, the present invention relates to a seismic isolation device, and the device is characterized by comprising: an upper plate fixed to an upper structure and having a spherically concave lower surface with a downward opening; a lower plate fixed to a lower structure; a movable body movably arranged under the upper plate; and a pillar-shaped connection part arranged between the movable body and the lower plate, an upper end of the connection part fixed to the movable body and a lower end of the connection part pivoted on the lower plate, wherein the movable body comprises a spherically convex upper surface opposing to the spherically concave lower surface of the upper plate, and plural air blowout ports on the spherically convex upper surface, and the seismic isolation device switches whether or not air is blown out of the plural air blowout ports, or selects one of the blowing air out of the plural air blowout ports, absorbing air from the plural air blowout ports and not performing both of the blowing and absorbing air to change frictional forces between the movable body and the upper plate, and between the movable body and the lower plate, and changes, in accordance with a magnitude of a horizontal external force added to the lower structure or a magnitude of a vibration transmitted to the upper structure, a horizontal force against the external force or the vibration. With this invention, in the same manner as the above invention, regardless of a load to be supported, a natural period of the upper structure can he lengthened to reduce acceleration, and obtaining a properly preferable frictional force enables excellent vibration energy absorbing capacity as well as a returning characteristic.

The above seismic isolation device may further comprises an air supplying means for supplying air to the movable body, wherein the air supplying means controls air supply to the movable body depending on the intensity of a horizontal external force added to the lower structure or the magnitude of a vibration transmitted to the upper structure. With this construction, a frictional force suitable for the intensity of the external force and others can properly be obtained, which allows excellent vibration energy absorbing capacity to be secured.

In the seismic isolation device described above, the air supplying means supplies air to the movable body when the intensity of the horizontal external force added to the lower structure or the magnitude of the vibration transmitted to the upper structure is smaller than a predetermined value, and the air supplying means stops supplying air to the movable body or absorbs air from the movable body when the intensity of the horizontal external force added to the lower structure or the magnitude of the vibration transmitted to the upper structure is more or equal to the predetermined value.

With the above-mentioned construction, when the vibration is relatively small, and the intensity of the external force applied to the lower structure or the magnitude of the vibration transmitted to the upper structure is lower than the predetermined value, an air layer is formed on a surface of the movable body, or load of the upper structure supported by the seismic isolation device is reduced by air pressure, not only the movable body can slide under the condition that no or small frictional force is generated but also preferable seismic isolation effect can be obtained by decreased acceleration through lengthened period, on the other hand, in case that the vibration is relatively large, and the intensity of the external force applied to the lower structure or the magnitude of the vibration transmitted to the upper structure is more or equal to the predetermined value, in addition to the decreased acceleration through lengthened period, damping with a frictional force that is determined by the materials of the movable body and others and a load to be supported is applied, so that vibration energy absorbing capacity can be improved, which secures safety at a large earthquake, etc. Further, absorbing air from the movable body, in addition to the frictional force that is determined by the materials of the movable body and others and the load to be supported, allows vibration energy to be damped by utilizing absorption force, which provides larger damping capacity. Therefore, for example, properly using the air supply, the stoppage of the supply and the absorption of the air enables at least three-stage seismic property with a single seismic isolation device. In this connection, the intensity of the external force as the predetermined value may properly be selected from acceleration, velocity and displacement.

The seismic isolation device described above can be constructed such that the air supplying means stops supplying air to the movable body or absorbs air from the movable body when the intensity of the horizontal external force added to the lower structure or the magnitude of the vibration transmitted to the upper structure is smaller than a predetermined value, and the air supplying means supplies air to the movable body when the intensity of the horizontal external force added to the lower structure or the magnitude of the vibration transmitted to the upper structure is more or equal to the predetermined value.

With the above construction, in a range where a vibration is relatively small, that is, the magnitude thereof is lower than the predetermined value, until an external force corresponding to a frictional force determined by the materials of the movable body and others and a load to be supported or a frictional force of an intensity to which absorption force generated by the air absorption is added, the upper structure can immovably be maintained, on the contrary, when a vibration transmitted to the upper structure is relatively large, that is, the magnitude of an external force added to the lower structure or the magnitude of a vibration transmitted to the upper structure is more or equal to the predetermined value, it becomes possible to absorb displacement under the condition that resistance force is small with a natural period of the upper structure lengthened, which enables usage as a trigger device.

In the above seismic isolation device, the spherically convex upper surface may have a curvature equal to that of the spherically concave lower surface, and the spherically convex lower surface may have a curvature equal to that of the spherically concave upper surface. With this construction, it is possible to float the movable body with predetermined clearances between the upper and lower plates or contact the movable body with the upper and lower plates through faces, which allows the upper structure to further stably be supported.

In the seismic isolation device, the air blowout port has an autogenous throttle shape or an orifice shape, and the air blowout ports can be utilized as air absorption holes also, or air absorption holes may be drilled separately.

The seismic isolation device may be constructed such that at least one of the upper surface and the lower surface of the movable body is formed from poly phenylene sulfide resin or reinforced synthetic resin made by mixing at least one of a glass fiber, a carbon fiber and an inorganic filler to the poly phenylene sulfide resin. This poly phenylene sulfide resin or the like has excellent sliding performance, so that both of stable load support and sliding performance can simultaneously be obtained. In addition, for example, even when an air supplier is in some trouble, preferable sliding performance is secured, which prevents excessive load from acting to the upper structure, so that a fail-safe function effect is also demonstrated. When a lubricating film with good sliding performance such as molybdenum disulfide or DLC is applied to the upper and lower surfaces of the movable body, the movable body may be formed of metallic materials.

In the above seismic isolation device, the air blowout port can be formed to be a round hole in planar view, and it is also possible to arrange the plural air blowout ports such that the ports are positioned on a same circumference or the ports are drawn on several similar diagrams with different dimensions and a same center. Further, an absorption force is determined by multiplying an absorption force per unit area and an area relating to the absorption, so that the plural air blowout ports can be drilled on a bottom face of a channel portion on the spherically convex upper surface or/and the spherically convex lower surface so as to be used as air absorption ports also.

Further, the present invention relates to a seismic isolation structure, and the structure is characterized by comprising at least three seismic isolation devices described above. With this invention, destruction of an upper structure, damage of a displayed object standing on the upper structure or the like can preferably be prevented.

As described above, with this invention, it is possible to provide a seismic isolation device, regardless of a load to be supported, capable of reducing acceleration through lengthening a natural period of an upper structure, with excellent vibration energy absorbing capacity by obtaining properly a preferable frictional force as well as a returning characteristic.

BRIEF DESCRIPTION OF THE DRAWINGS

The present invention will be more apparent from the ensuring description with reference to the drawings, wherein.

DETAILED DESCRIPTION OF THE INVENTION

Next, embodiments of the present invention will be explained in detail with reference to figures.

Figure 1:
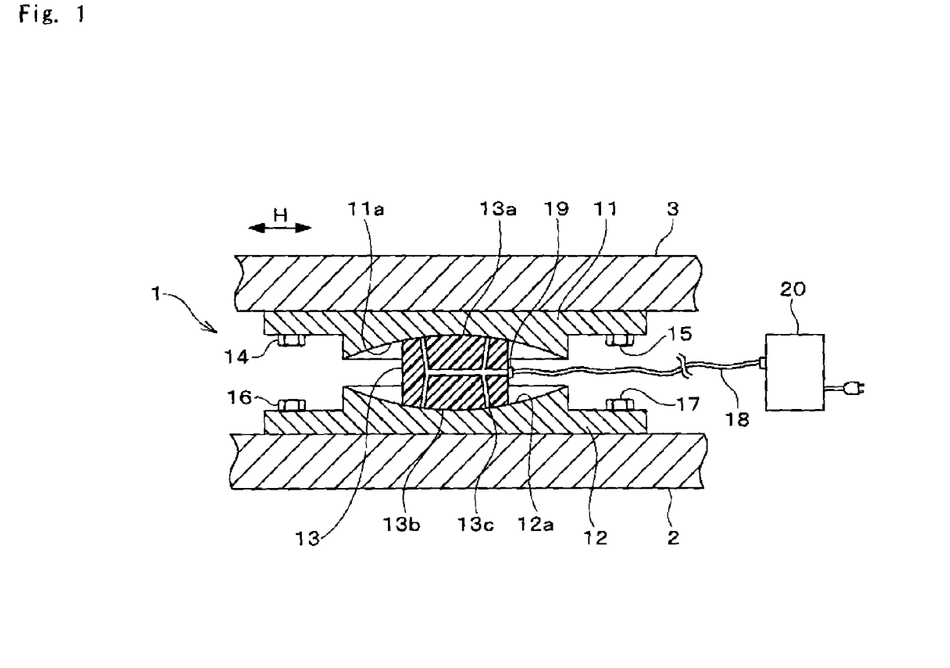
FIG. 1 is a cross-sectional view showing a seismic isolation device according to the first embodiment of the present invitation.

FIG. 1 shows a seismic isolation device according to the first embodiment of the present invention, this seismic isolation device 1 is mounted between a lower structure 2 such as a foundation of a detached house and an upper structure 3, such as a detached house, which is movable in a horizontal direction H in relation to the lower structure 2 through the seismic isolation device 1.

The seismic isolation device 1 is provided with an upper plate 11 that is fixed to the upper structure 3 and has a spherically concave lower surface 11a with a downward opening; a lower plate 12 that is fixed to the lower structure 2 and has a spherically concave upper surface 12a with an upward opening; and a movable body 13 that is movably arranged between the upper plate 11 and the lower plate 12. The upper plate 11 is fixed to the upper structure 3 with the bolts 14, 15, and the lower plate 12 is fixed to the lower structure 2 with the bolts 16, 17.

The movable body 13 is provided with a spherically convex upper surface 13a opposing to the spherically concave lower surface 11a of the upper plate 11, a spherically convex lower surface 13b opposing to the spherically concave upper surface 12a of the lower plate 12, and plural air blowout ports 13c on the spherically convex upper surface 13a and the spherically convex lower surface 13b. The spherically convex upper surface 13a of the movable body 13 has the same curvature as the spherically concave lower surface 11a of the upper plate 11, and the spherically convex lower surface 13b of the movable body 13 has the same curvature as the spherically concave upper surface 12a of the lower plate 12.

Figure 2:
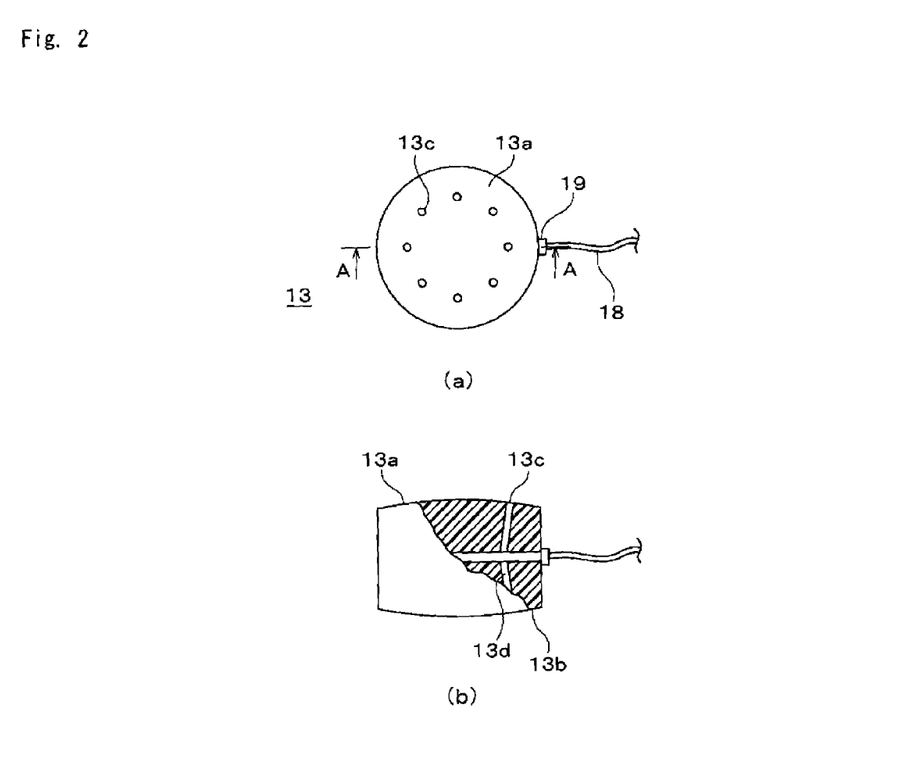
FIG. 2 is a drawing showing a movable body of the seismic isolation device shown in FIG. 1, in which (a) is a top view, (b) a partially fragmented cross-sectional view (the cross section taken along the line A-A of (a))

As shown in FIG. 2, the movable body 13 is formed to be a substantially thick disk on the whole, and is provided with a metal fitting 19 for connecting a flexible hose 18 for air supply, and through the movable body 13 are drilled air passages 13d for introducing air taken through the metal fitting 19 to the air blowout ports 13c. The air blowout port 13c is, as clearly illustrated in FIG. 2(a), formed to be a round hole in planar view, and plural air blowout ports 13c are arranged on the same circumference. The plural air blowout ports 13c can be arranged on several similar diagrams with different dimensions and the same center.

The upper or lower surface of the movable body 13, or the whole of the movable body 13 may be formed from poly phenylene sulfide resin or reinforced synthetic resin made by mixing at least one of a glass fiber, a carbon fiber and an inorganic filler to the poly phenylene sulfide resin.

As shown in FIG. 1, in order to supply air to the movable body 13, an air pump 20 is mounted, and air is introduced to the movable body 13 via the flexible hose 18 and the metal fitting 19. Meanwhile, the air pump 20 functions as a vacuum pump for absorbing air from the movable body 13 through the metal fitting 19 and the flexible hose 18 also.

Figure 3:
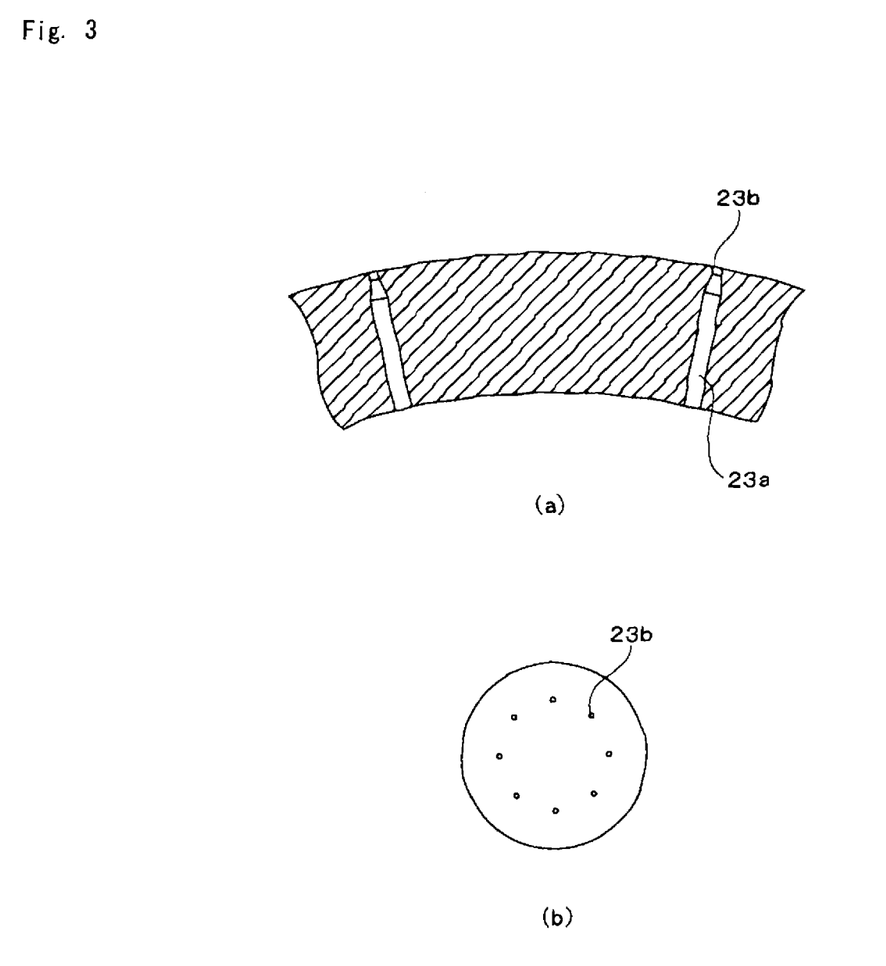
FIG. 3 is a drawing showing another air blowout spout formed on the movable body of the seismic isolation device according to the present invitation, in which (a) is a cross-sectional view, (b) a top view.
Figure 4:
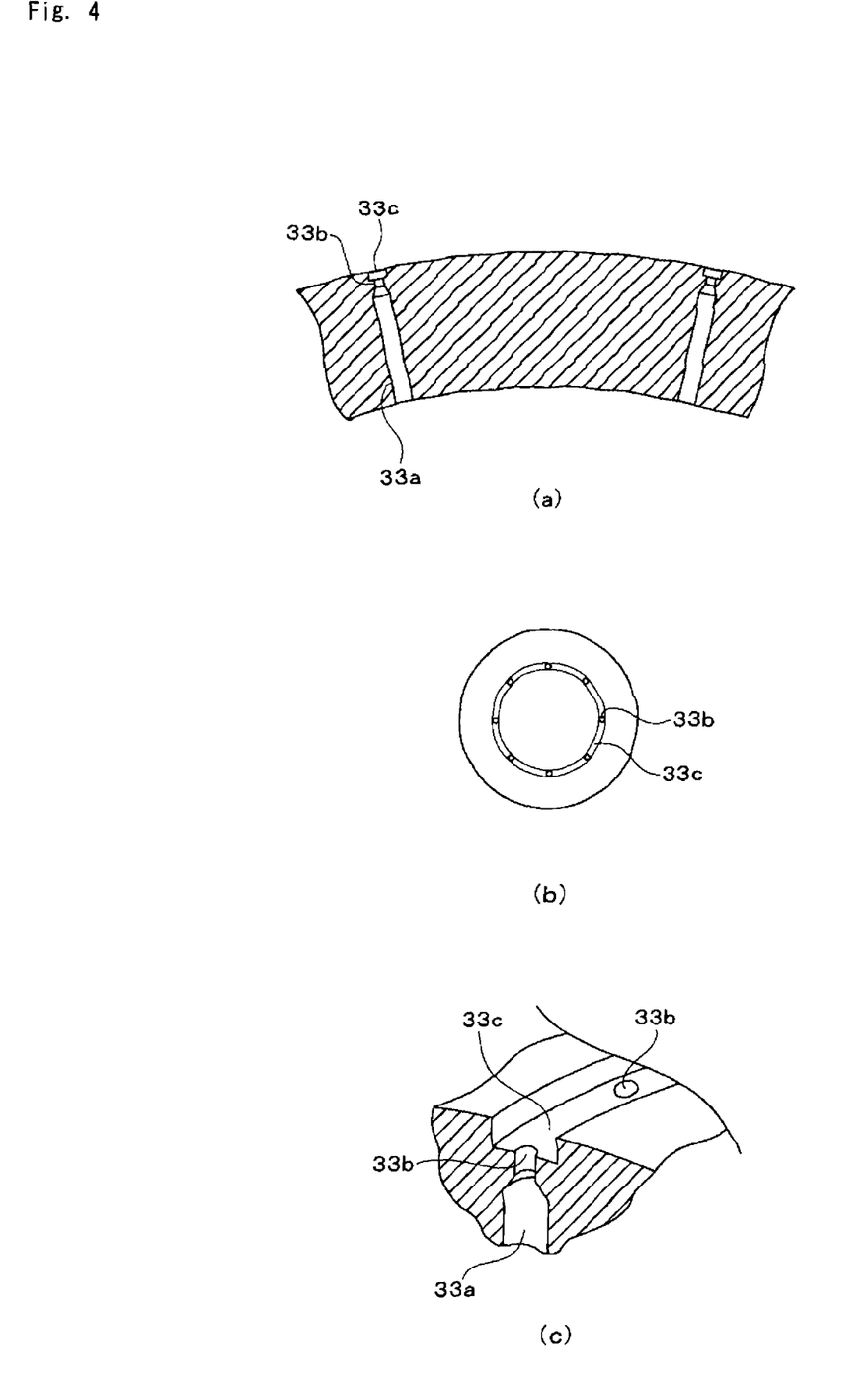
FIG. 4 is a drawing showing another air blowout spout formed on the movable body of the seismic isolation device according to the present invitation, in which (a) is a cross-sectional view, (b) a top view, (c) a partially fragmented perspective view.

The air blowout port may be, other than a round hole with the same diameter in an axial direction as shown in FIGS. 1 and 2, as illustrated in FIG. 3, an autogenous throttle shape in which a portion of an air passage 23a adjacent to a blowout port 23b is throttled, or as shown in FIG. 4, the air blowout port can be a so-called orifice shape having an air blowing channel 33c wider than the diameter of the end portion 33b of the air passage 33a. As for arrangement of the air blowout ports, where the diameter of the movable body is $\phi D$ and the diameter of a circle on which the air blowout ports are drilled is $\phi Di$, it is preferable that $\phi Di = (0.6 \sim 0.7) \times \phi D$.

Figure 5:
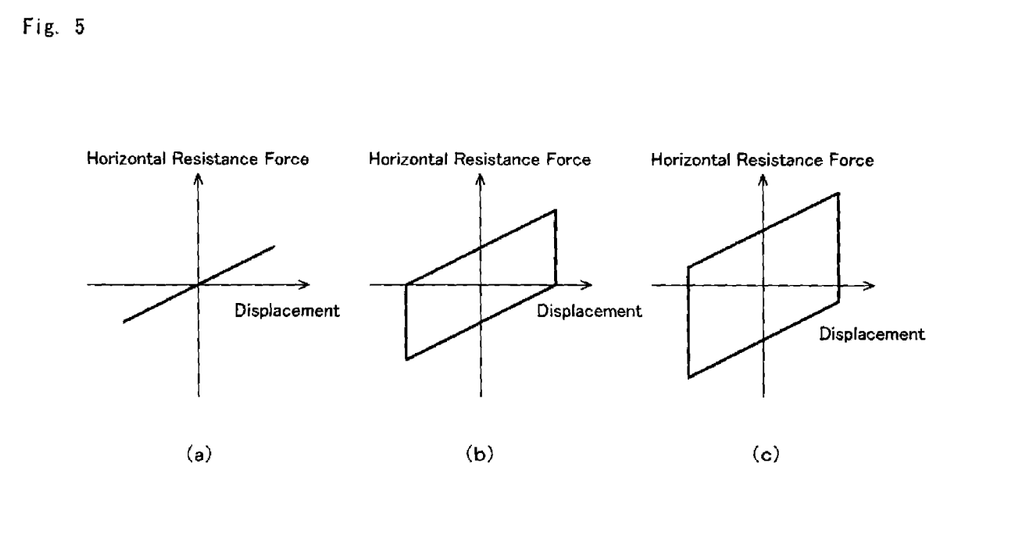
FIG. 5 is a hysteresis curves showing relation between horizontal resistance forces and horizontal displacements (relative displacements between the upper structure 3 and the lower structure 2) of the seismic isolation device of the present invention, in which (a) shows the state air is supplied, (b) shows the state air is supplied without absorption, (c) shows the state air is absorbed.

Next, the motion of the seismic isolation device 1 with the above-mentioned construction will be explained with reference to FIGS. 1, 2 and 5. FIG. 5 shows hysteresis diagrams indicating the relation between horizontal resistance forces and horizontal displacements (relative displacements between the upper structure 3 and the lower structure 2 of the seismic isolation device 1), in which (a) shows a case that air is supplied to the movable body 13; (b) shows a case that air is not supplied to the movable body 13 and air is not absorbed from the movable body 13; and (c) shows a case that air is absorbed from the movable body 13. In case of (a), that is, when air is supplied to the movable body 13, since the movable body 13 is movable without generating frictional force, the relative displacement occurs at small horizontal resistance force; in case of (b), that is, when air is not supplied to the movable body 13 and air is not absorbed from the movable body 13, since no air exists between the movable body 13 and the upper plate 11, and between the movable body 13 and the lower plate 12, the same relative displacement provides a larger horizontal resistance force; and in case of (c), that is, when air is absorbed from the movable body 13, since stronger absorption forces act between the movable body 13 and the upper plate 11, and between the movable body 13 and the lower plate 12, the same relative displacement provides a much larger horizontal resistance force.

In the below explanation, at first, the following motion will be explained. In the seismic isolation device 1, when the intensity of an external force added to the lower structure 2, or the magnitude of a vibration transmitted to the upper structure 3 is smaller than a predetermined value, air is supplied from the air pump 20 to the movable body 13, and when the intensity of an external force added to the lower structure 2, or the magnitude of a vibration transmitted to the upper structure 3 is more or equal to the predetermined value, the air pump 20 is stopped to stop supplying air to the movable body 13. With this motion, when a vibration is relatively small and an added external force is smaller than the predetermined value, a small horizontal resistance force operates the seismic isolation device 1 to obtain preferable seismic isolation effect through reduction in acceleration due to lengthened period, on the contrary, when a vibration is relatively large and an added external force is more than the predetermined value, in addition to the reduction in acceleration due to lengthened period, damping is performed by a frictional force that is determined by the materials of the movable body and others and a load to be supported, which improves absorbing power to vibration energy, and safety at a large earthquake or the like can be secured.

Normally, from the air pump 20, through the flexible hose 18 and the metal fitting 19 is supplied air to the movable body 13. The air supplied from the metal fitting 19 to the movable body 13 is jetted toward the spherically concave lower surface 11a and the spherically concave upper surface 12a from the air blowout ports 13c via the air passages 13d. With this, air layers are formed between the spherically convex lower surface 13b of the movable body 13 and the spherically concave upper surface 12a of the lower plate 12, and between the spherically convex upper surface 13a of the movable body 13 and the spherically concave lower surface 11a of the upper plate 11, so that as shown in FIG. 5(a), the movable body 13 can be moved without frictional force being generated, in other words, a small horizontal resistance force will operate the seismic isolation device 1 to obtain preferable seismic insulation effect through reduction in acceleration due to lengthened period. This condition is continuously maintained as long as external forces added to the lower structure 2 are smaller than the predetermined value.

On the other hand, at a large earthquake or the like by which an external force more than the predetermined value is added, the operation of the air pump 20 is stopped to stop feeding air to the movable body 13. With this, the spherically convex lower surface 13b of the movable body 13 and the spherically concave upper surface 12a of the lower plate 12, and the spherically convex upper surface 13a of the movable body 13 and the spherically concave lower surface 11a of the upper plate 11 respectively directly contact with each other to allow the movable body 13 to slide. As a result, as shown in FIG. 5(b), in addition to the reduction in acceleration due to lengthened period, damping is performed by a frictional force that is determined by the materials of the movable body 13 and others and a load to be supported, which improves absorbing power to vibration energy to secure safety.

Meanwhile, in the above embodiment, when the intensity of an external force added to the lower structure 2, or the magnitude of a vibration transmitted to the upper structure 3 becomes more or equal to a predetermined value, the air pump 20 is stopped, at this moment, the air pump 20 is caused to function as a vacuum pump to absorb air from the movable body 13 also. In such a case, as shown in FIG. 5(c), in addition to a frictional force determined by the materials of the movable body 13 and others and a load to be supported, vibration energy can be damped by utilizing absorption power, which enables larger damping capacity.

Next, the following motion will be explained. In the seismic isolation device 1, when the intensity of an external force added to the lower structure 2, or the magnitude of a vibration transmitted to the upper structure 3 is smaller than a predetermined value, the air pump 20 is stopped to stop supplying air to the movable body 13, and when the intensity of an external force added to the lower structure 2, or the magnitude of a vibration transmitted to the upper structure 3 is more or equal to the predetermined value, the air pump 20 is operated to feed air to the movable body 13. With this motion, in a range where a vibration is relatively small, until an external force corresponding to a frictional force determined by the materials of the movable body 13 and others and a load to be supported is inputted, the upper structure 3 can immovably be maintained, on the contrary, when a vibration is large and the intensity of an external force becomes more or equal to the predetermined value, it is possible to absorb displacement under the condition that a resistance force is small with a natural period of the upper structure 3 lengthened, which allows the seismic isolation device 1 to function as a trigger device.

Meanwhile, in the above embodiment, when the intensity of an external force added to the lower structure 2, or the magnitude of a vibration transmitted to the upper structure 3 is smaller than the predetermined value, the air pump 20 is stopped, at this moment, the air pump 20 is caused to function as a vacuum pump to absorb air from the movable body 13 also. In such a case, in addition to a frictional force determined by the materials of the movable body 13 and others and a load to be supported, the upper structure 3 can immovably be maintained through a larger force by utilizing an absorption force.

Further, although the air blowout ports with autogenous throttle shape shown in FIG. 3 have the same motion as described above, as shown in FIG. 4, the air blowout ports with orifice shape with the air blowout channels 33c are able to supply or absorb air to and from the overall area of the sliding body, which secures stabler motion of the sliding body. In this connection, an absorption force is determined by multiplying an absorption force per unit area and an area relating to the absorption, so that more absorption channels can be formed to increase the absorption force.

Next, a seismic isolation structure to which the above seismic isolation device 1 is applied will be explained with reference to FIG. 6.

This seismic isolation structure 35 is provided with at least three seismic isolation devices 1 that are mounted between a foundation 36 and a detached house 37, and each seismic isolation device 1 transmits the load of the detached house 37 to the foundation 36 as well as permits a relative horizontal displacement between the foundation 36 and the detached house 37. Then, at a horizontal displacement of the foundation 36 due to an earthquake or the like, the seismic isolation devices 1 function as described above, which prevents a horizontal vibration of the foundation 36 from transmitting to the detached house 37 as it is and lengthens a natural period of the detached house 37, resulting in reduced acceleration to the detached house 37, etc.

Next, a seismic isolation device according to the second embodiment of the present invention will be explained with reference to FIG. 7. This seismic isolation device 41 is also mounted between a lower structure 42 such as a foundation of a detached house and an upper structure 43, such as a detached house, which is movable in a horizontal direction H in relation to the lower structure 42 via the seismic isolation device 41.

The seismic isolation device 41 is provided with an upper plate 51 that is fixed to the upper structure 43; a lower plate 52 that is fixed to the lower structure 42 and has a spherically concave upper surface 52a with an upward opening; a movable body 53 that is movably arranged between the upper plate 51 and the lower plate 52; and a pillar-shaped connection part 44 arranged between the movable body 53 and the upper plate 51, in which a spherical member 44a of the pillar-shaped connection part 44 is pivoted on the upper plate 51 through retaining members 45, 46, and a lower end of a body portion 44b of the pillar-shaped connection part 44 is fixed to the movable body 53. The upper plate 51 is fixed to the upper structure 43 with the bolts 54, 55, and the lower plate 52 is fixed to the lower structure 42 with the bolts 56, 57.

The movable body 53 is provided with a flat upper surface 53b and a spherically convex face at a lower portion thereof, and is formed to be a substantially thick disk on the whole. To the upper surface 53b is fixed the lower end of the pillar-shaped connection part 44; a spherically convex lower surface 53a opposing to the spherically concave upper surface 52a of the lower plate 52 is mounted; and the spherically convex lower surface 53a is provided with plural air blowout ports 53c. The spherically convex lower surface 53a of the movable body 53 has the same curvature as the spherically concave upper surface 52a of the lower plate 52.

The movable body 53 is provided with a metal fitting 59 for connecting a flexible hose 58 for air supply, and through the movable body 53 are drilled air passages 53d for introducing air taken through the metal fitting 59 to the air blowout ports 53c. The air blowout port 53c is, although drawing thereof is omitted, in the same manner as the movable body 13 shown in FIG. 2, formed to be a round hole in planar view, and plural air blowout ports 53c are arranged on the same circumference.

The lower surface or the whole of the movable body 53 may be formed from poly phenylene sulfide resin or reinforced synthetic resin made by mixing at least one of a glass fiber, a carbon fiber and an inorganic filler to the poly phenylene sulfide resin. When a lubricant with good sliding performance such as molybdenum disulfide or DLC is applied to the lower surface, the movable body may be formed of metallic materials.

In order to supply air to the movable body 53, an air pump 60 is mounted, and air is introduced to the movable body 53 via the flexible hose 58 and the metal fitting 59. Meanwhile, the air pump 60 functions as a vacuum pump for absorbing air from the movable body 53 through the metal fitting 59 and the flexible hose 58 also.

The pillar-shaped connection part 44 is provided with the spherical portion 44a at an upper portion thereof, and the truncated-cone-shaped and columnar body portion 44b at a lower portion thereof, and as described above, the spherical portion 44a is pivoted on the upper plate 51 through the retaining members 45, 46, and a lower end of the body portion 44b is fixed to the movable body 53. With this, the pillar-shaped connection part 44 is movable together with the movable body 53, and is rotatably connected with the upper plate 51 as well.

Next, the motion of the seismic isolation device 41 with the above-mentioned construction will be explained with reference to FIG. 7.

In the below explanation also, in the same manner as the first embodiment, at first, the following motion will be explained. In the seismic isolation device 41, when the intensity of an external force added to the lower structure 42, or the magnitude of a vibration transmitted to the upper structure 43 is smaller than a predetermined value, air is supplied from the air pump 60 to the movable body 53, and when the intensity of an external force added to the lower structure 42, or the magnitude of a vibration transmitted to the upper structure 43 is more or equal to the predetermined value, the air pump 60 is stopped to stop supplying air to the movable body 53. With this motion, when a vibration is relatively small and an added external force is smaller than the predetermined value, a small horizontal resistance force operates the seismic isolation device 41 to obtain preferable seismic isolation effect through reduction in acceleration due to lengthened period, on the contrary, when a vibration is relatively large and an added external force is larger than the predetermined value, in addition to the reduction in acceleration due to lengthened period, damping is performed by a frictional force that is determined by the materials of the movable body and others and a load to be supported, which improves absorbing power to vibration energy, and safety at a large earthquake or the like can be secured.

Normally, from the air pump 60 and through the flexible hose 58 and the metal fitting 59 is supplied air to the movable body 53. The air supplied from the metal fitting 59 to the movable body 53 is jetted toward the spherically concave upper surface 52a from the air blowout ports 53c via the air passages 53d. With this, an air layer is formed between the spherically concave lower surface 53a of the movable body 53 and the spherically concave upper surface 52a of the lower plate 52, so that while rotating the spherical portion 44a of the pillar-shaped connection part 44 in relation to the retaining members 45, 46, the movable body 53 can be moved without frictional force being generated, in other words, a small horizontal resistance force will operate the seismic isolation device 41 to obtain preferable seismic insulation effect through reduction in acceleration due to lengthened period. This condition is continuously maintained as long as external forces added to the lower structure 42 are smaller than the predetermined value.

On the other hand, at a large earthquake or the like, the operation of the air pump 60 is stopped to stop feeding air to the movable body 53. With this, the spherically convex lower surface 53a of the movable body 53 and the spherically concave upper surface 52a of the lower plate 52 directly contact with each other to allow the movable body 53 to slide on the spherically concave upper surface 52a of the lower plate 52 through the spherically convex lower surface 53a while rotating the spherical portion 44a of the pillar-shaped connection part 44 in relation to the retaining members 45, 46. As a result, in addition to the reduction in acceleration due to lengthened period, damping is performed by a frictional force that is determined by the materials of the movable body 53 and the lower plate 52 and a load to be supported, which improves absorbing power to vibration energy to secure safety.

Meanwhile, in the above embodiment, when the intensity of an external force added to the lower structure 42, or the magnitude of a vibration transmitted to the upper structure 43 becomes more or equal to the predetermined value, the air pump 60 is stopped, at this moment, the air pump 60 is caused to function as a vacuum pump to absorb air from the movable body 53 also. In such a case, in addition to the frictional force determined by the materials of the movable body 53 and others and a load to be supported, vibration energy can be damped by utilizing absorption power, which enables larger damping capacity.

Next, the following motion will be explained. In the seismic isolation device 41, when the intensity of an external force added to the lower structure 42, or the magnitude of a vibration transmitted to the upper structure 43 is smaller than a predetermined value, the air pump 60 is stopped to stop supplying air to the movable body 53, and when the intensity of an external force added to the lower structure 42, or the magnitude of a vibration transmitted to the upper structure 43 is more or equal to the predetermined value, the air pump 60 is operated to feed air to the movable body 53. With this motion, in a range where a vibration is relatively small, until an external force corresponding to a frictional force determined by the materials of the movable body 53 and others and a load to be supported, the upper structure 43 can immovably be maintained, on the contrary, when a vibration is large and the intensity of an external force becomes more or equal to the predetermined value, it is possible to absorb displacement under the condition that a resistance force is small with a natural period of the upper structure 43 lengthened, which allows the seismic isolation device 1 to function as a trigger device.

Meanwhile, in the above embodiment, when the intensity of an external force added to the lower structure 42, or the magnitude of a vibration transmitted to the upper structure 43 is smaller than the predetermined value, the air pump 60 is stopped, at this moment, the air pump 60 is caused to function as a vacuum pump to absorb air from the movable body 53 also. In such a case, in addition to the frictional force determined by the materials of the movable body 53 and others and a load to be supported, the upper structure 43 can immovably be maintained through a larger force by utilizing an absorption force.

Figure 7:
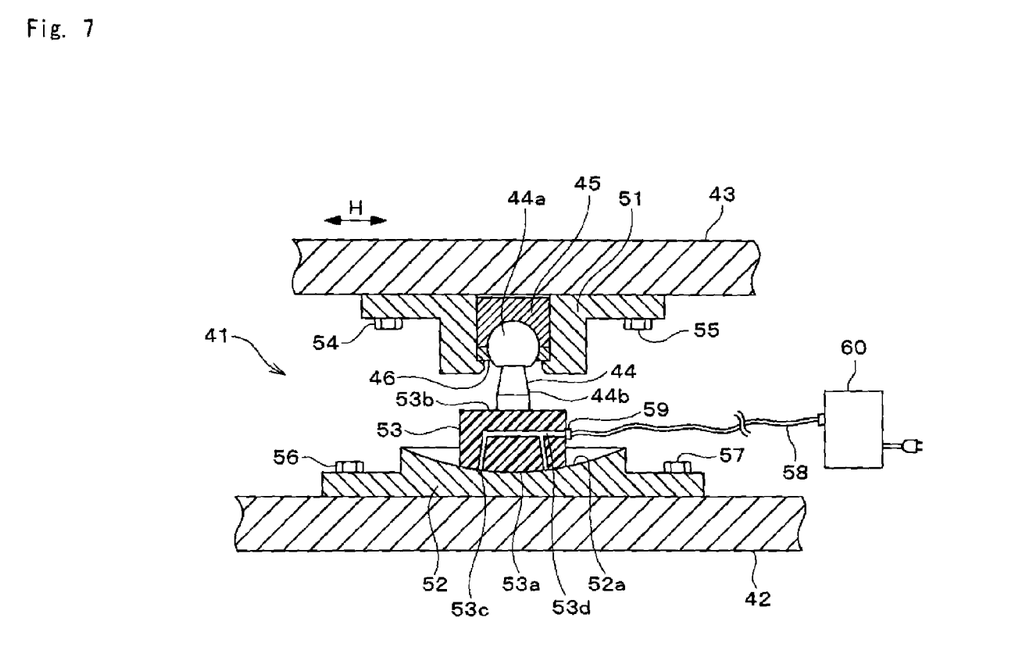
FIG. 7 is a cross-sectional view showing a seismic isolation device according to the second embodiment of the present invitation.

Further, in the above embodiment, although explanation was made when on the upper face of the movable body 53 is fixed the pillar-shaped connection part 44, and through the spherically convex lower surface 53a, on the spherically concave upper surface 52a of the lower plate 52 moves the movable body 53, the constituents may vertically be reversed in FIG. 7, and it is possible to construct such that on the lower face of the movable body is fixed the pillar-shaped connection part, and through the spherically convex upper surface, on the spherically concave lower surface of the upper plate moves the movable body. In addition, although in the seismic isolation device 41 shown in FIG. 7, the spherical portion 44a is pivoted on the upper plate 51 via the retaining members 45, 46, and the body portion 44b is fixed to the movable body 53, it is possible to allow the spherical portion 44a to be pivoted on the movable body 53 via the retaining members 45, 46, and the body portion 44b to be fixed to the upper plate 51.

Figure 6:
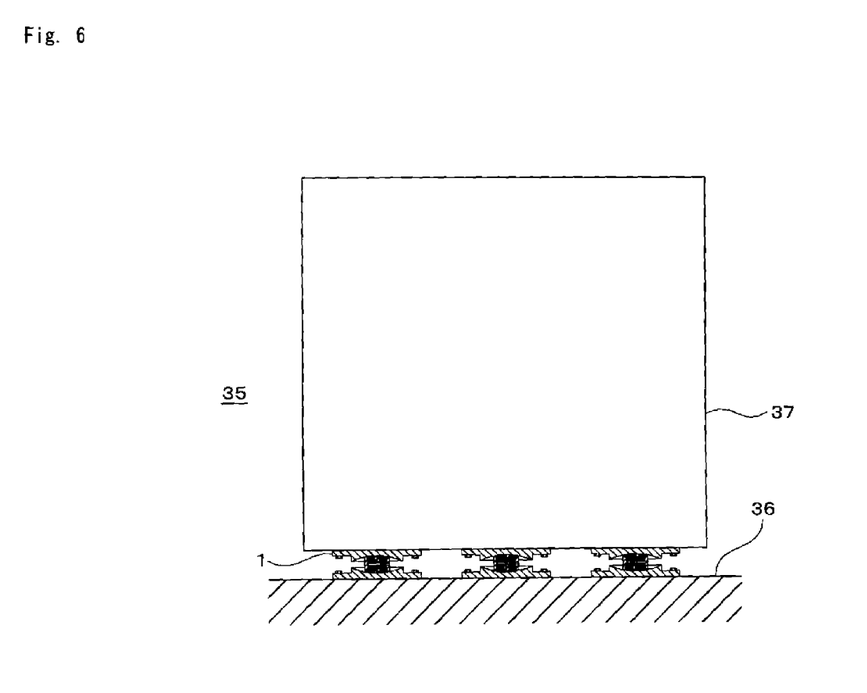
FIG. 6 is a diagrammatical view showing a seismic isolation structure with the seismic isolation device of the present invention.

The seismic isolation device 41 illustrated in FIG. 7 is also, in place of the seismic isolation device 1, applicable to the seismic isolation structure 35 shown in FIG. 6, which functions in the same manner as the seismic isolation device 1.

EXPLANATION OF REFERENCE NUMBERS

1 seismic isolation device
2 lower structure
3 upper structure
11 upper plate
11a spherically concave lower surface
12 lower plate
12a spherically concave upper surface
13 movable body
13a spherically convex upper surface
13b spherically convex lower surface
13c air blowout port
13d air passage
14-17 bolts
18 flexible hose
19 metal fitting
20 air pump
23a air passage
23b blowout port
33a air passage
33b end portion
33c air blowing channel
35 seismic isolation structure
36 foundation
37 detached house
41 seismic isolation device
42 lower structure
43 upper structure
44 pillar-shaped connection part
44a spherical portion
44b body portion
45 retaining member
46 retaining member
51 upper plate
52 lower plate
52a spherically concave upper surface
53 movable body
53a spherically convex lower surface
53b upper surface
53c air blowout port
53d air passage
54-57 bolts
58 flexible hose
59 metal fitting
60 air pump

The invention claimed is:

1. A seismic isolation device for isolating an upper structure from a lower structure, the seismic isolation device comprising:
an upper plate adapted to be fixed to the upper structure and having a spherically concave lower surface with a downward opening;
a lower plate adapted to be fixed to the lower structure and having a spherically concave upper surface with an upward opening;
a movable body movably arranged between the upper plate and the lower plate, wherein said movable body comprises a spherically convex upper surface opposing to the spherically concave lower surface of the upper plate, and a spherically convex lower surface opposing to the spherically concave upper surface of the lower plate, at least one of the spherically convex upper surface and the spherically convex lower surface having a plurality of air blowout ports; and
an air controller in operative communication with the air blowout ports and configured to selectively switch between:
a first mode wherein air is supplied to the plurality of air blowout ports;
a second mode subsequent to the first mode wherein the supply of air is stopped; and
a third mode wherein air is withdrawn from the plurality of air blowout ports;
the air controller selectively switching between the first, second and third modes based upon at least one of a frictional force between the moveable body and the upper plate and a frictional force between the moveable body and the lower plate.

2. The seismic isolation device as claimed in claim 1, wherein said air controller controls air supply to the movable body depending on an intensity of a horizontal external force added to the lower structure or a magnitude of a vibration transmitted to the upper structure.

3. The seismic isolation device as claimed in claim 2, wherein said air controller supplies air to the movable body when the intensity of the horizontal external force added to the lower structure or the magnitude of the vibration transmitted to the upper structure is smaller than a predetermined value, and the air controller stops supplying air to the movable body or absorbs air from the movable body when the intensity of the horizontal external force added to the lower structure or the magnitude of the vibration transmitted to the upper structure is more or equal to the predetermined value.

4. The seismic isolation device as claimed in claim 2, wherein said air controller stops supplying air to the movable body or absorbs air from the movable body when the intensity of the horizontal external force added to the lower structure or the magnitude of the vibration transmitted to the upper structure is smaller than a predetermined value, and the air controller supplies air to the movable body when the intensity of the horizontal external force added to the lower structure or the magnitude of the vibration transmitted to the upper structure is more or equal to the predetermined value.

5. The seismic isolation device as claimed in claim 1, wherein said spherically convex upper surface of the movable body has a curvature equal to that of the spherically concave lower surface of the upper plate, and the spherically convex lower surface of the movable body has a curvature equal to that of the spherically concave upper surface of the lower plate.

6. The seismic isolation device as claimed in claim 1, wherein said air blowout ports each have an autogenous throttle shape or an orifice shape.

7. The seismic isolation device as claimed in claim 1, wherein said air blowout ports of the movable body are configured as air absorption ports when air is absorbed from the movable body.

8. The seismic isolation device as claimed in claim 7, wherein said plural air blowout ports are drilled on a bottom of a channel portion formed on the spherically convex upper surface or/and the spherically convex lower surface, and the ports are configured as air absorption ports.

9. The seismic isolation device as claimed in claim 1, wherein at least one of the upper surface and the lower surface of the movable body is formed from poly phenylene sulfide resin or reinforced synthetic resin made by mixing at least one of a glass fiber, a carbon fiber and an inorganic filler to said poly phenylene sulfide resin.

10. The seismic isolation device as claimed in claim 9, wherein said plural air blowout ports are drilled on a bottom of a channel portion formed on the spherically convex upper surface or/and the spherically convex lower surface, and the ports are configured as air absorption ports.

11. The seismic isolation device as claimed in claim 1, wherein said movable body is composed of metallic materials, and one of the upper surface and the lower surface thereof has a lubricating film formed from molybdenum disulfide or DLC (Diamond like carbon).

12. The seismic isolation device as claimed in claim 11, wherein said plural air blowout ports are drilled on a bottom of a channel portion formed on the spherically convex upper surface or/and the spherically convex lower surface, and the ports are configured as air absorption ports.

13. The seismic isolation device as claimed in claim 1, wherein said air blowout port is formed to be a round hole in planar view.

14. The seismic isolation device as claimed in claim 13, wherein said plural air blowout ports are drilled on a bottom of a channel portion formed on the spherically convex upper surface or/and the spherically convex lower surface, and the ports are configured as air absorption ports.

15. The seismic isolation device as claimed in claim 1, wherein said plural air blowout ports are arranged such that the ports are positioned on a same circumference or the ports are drawn on several similar diagrams with different dimensions and a same center.

16. The seismic isolation device as claimed in claim 15, wherein said plural air blowout ports are drilled on a bottom of a channel portion formed on the spherically convex upper surface or/and the spherically convex lower surface, and the ports are configured as air absorption ports.

17. A seismic isolation structure comprising at least three seismic isolation devices claimed in claim 1.

18. The seismic isolation device as claimed in claim 1, further comprising an annular channel formed on one of the spherically convex upper surface and the spherically convex lower surface, the air blowout ports being located within the annular channel.

19. The seismic isolation device as claimed in claim 1, further comprising a flexible hose fluidly coupled to the air controller and the moveable body to facilitate fluid communication therebetween, the flexible hose having a portion extending between the upper plate and the lower plate.

20. A seismic isolation device for use in isolating a first structure from a second structure, the seismic isolation device comprising:

a first plate connectable to the first structure;

a second plate connectable to the second structure;

an intermediate body movably arranged between the first plate and the second plate, the intermediate body being complimentary in shape to both the first plate and the second plate, the intermediate body having a primary fluid passageway extending therethrough, and a plurality of secondary passageways extending from the primary fluid passageway, wherein at least two of the secondary passageways extend in radially opposite directions relative to each other from the primary passageway, the second passageways defining a plurality of air blowout ports;

a hose connected to the intermediate body and in fluid communication with the primary fluid passageway, a portion of the hose extending between the first plate and the second plate; and an air controller fluidly coupled to the hose to provide air to the air blowout ports, the air controller being configured to selectively switch between:

a first mode wherein air is supplied to the plurality of air blowout ports;

a second mode subsequent to the first mode wherein the supply of air is stopped; and a third mode wherein air is withdrawn from the plurality of air blowout ports;

the air controller selectively switching between the first, second and third modes based upon at least one of a frictional force between the moveable body and the first plate and a frictional force between the moveable body and the second plate.

* * * * *